(12) United States Patent
Kienzle

(10) Patent No.: US 8,155,772 B2
(45) Date of Patent: Apr. 10, 2012

(54) METHOD AND SYSTEM FOR INTEGRATING A RESTRICTION OBJECT WITH A MATERIAL OBJECT

(75) Inventor: Stefan Kienzle, St.Leon-Rot (DE)

(73) Assignee: SAP AG, Walldorf (DE)

( * ) Notice: Subject to any disclaimer, the term of this patent is extended or adjusted under 35 U.S.C. 154(b) by 251 days.

(21) Appl. No.: 12/212,658

(22) Filed: Sep. 18, 2008

(65) Prior Publication Data

US 2009/0198364 A1 Aug. 6, 2009

Related U.S. Application Data

(60) Provisional application No. 61/025,835, filed on Feb. 4, 2008.

(51) Int. Cl.
G06F 19/00 (2006.01)
G06F 17/30 (2006.01)
A01K 5/02 (2006.01)

(52) U.S. Cl. .............. 700/107; 707/999.103; 705/29

(58) Field of Classification Search ............. None
See application file for complete search history.

(56) References Cited

U.S. PATENT DOCUMENTS

| | | | | |
|---|---|---|---|---|
| 5,287,267 A * | 2/1994 | Jayaraman et al. | | 705/7.31 |
| 5,630,070 A * | 5/1997 | Dietrich et al. | | 705/7.23 |
| 5,826,236 A * | 10/1998 | Narimatsu et al. | | 705/7.24 |
| 5,845,258 A * | 12/1998 | Kennedy | | 705/7.25 |
| 5,970,465 A * | 10/1999 | Dietrich et al. | | 705/7.22 |
| 6,044,356 A * | 3/2000 | Murthy et al. | | 705/7.25 |
| 7,653,452 B2 * | 1/2010 | Sauermann et al. | | 700/106 |
| 2002/0120533 A1 * | 8/2002 | Wiesenmaier | | 705/27 |
| 2003/0229550 A1 * | 12/2003 | DiPrima et al. | | 705/28 |
| 2005/0114202 A1 * | 5/2005 | Chua et al. | | 705/10 |
| 2005/0177435 A1 * | 8/2005 | Lidow | | 705/22 |
| 2005/0228521 A1 * | 10/2005 | Nomoto et al. | | 700/97 |

* cited by examiner

Primary Examiner — Mussa A Shaawat

(57) ABSTRACT

A method and system for integrating a restriction object with a material object is provided. A reference is generated between a material object and a restriction object. A restriction note is received from a supplier having a material restriction for a material in the material object. A material position is searched in the material object using a material number of the material. A selection condition is determined based on which the material is chosen from the material position. A restriction condition is generated in the restriction object based on the material restriction and the selection condition.

16 Claims, 4 Drawing Sheets

METHOD AND SYSTEM FOR INTEGRATING A RESTRICTION OBJECT WITH A MATERIAL OBJECT

This application claims the benefit of and priority to U.S. Provisional Patent Application No. 61/025,835, filed Feb. 4, 2008, titled "METHOD AND SYSTEM FOR INTEGRATING A RESTRICTION OBJECT WITH A MATERIAL OBJECT," which is incorporated herein by reference in its entirety.

TECHNICAL FIELD

Embodiments of the invention generally relate to computer systems, and more particularly to a method and system for integrating a restriction object with a material object.

BACKGROUND

In production systems, a material object typically is a complete, structured list of the components or materials that make up a product. The structured list contains the description, the quantity, and unit of measure of the components. The material object typically includes a hierarchy of nodes with each node having one or more material positions. Each material position generally has one material that may be used to produce the product. A material is typically selected from a corresponding material position based on a selection condition. The selection condition is typically a Boolean expression. A material from a material position is generally selected for production of the product only if the selection condition for the material position is true. A restriction object typically holds one or more restriction conditions that typically have information about the quantity restrictions for one or more materials.

For example the material object may have a list of materials for manufacturing a passenger car. A material at a material position may be configured to be chosen for the production of the car based on a selection condition such as a red car for sale in European countries. The restriction object may have a restriction condition that limits the supply of the material to 500 pieces a day.

The current production systems have the material objects and the restriction objects as independent objects with no integration between them. The restriction condition for a material is generally assigned to the selection condition. Thus there is a need to know the material positions in the material object that have the selection condition assigned to them. As there is no integration between the restriction object and the material object, it is very difficult to find out the material positions in the material object. There may be several restriction conditions defined for various materials in the restriction object resulting in several production bottlenecks at various material positions in the material object. The absence of integration between the restriction object and the material object makes it very difficult to determine the position of the bottlenecks in the material objects. Thus there is no transparency of information as the bottlenecks are not visible by looking at the material object.

Furthermore the absence of integration between the material object and the restriction object may lead to data inconsistency. For example, a material may be deleted from the material object and a restriction condition for the material may still exist in the restriction object.

SUMMARY OF THE INVENTION

Embodiments of the invention are generally directed to a method and system for integrating a restriction object with a material object. A reference is generated between a material object and a restriction object. A restriction note is received from a supplier having a material restriction for a material in the material object. A material position is searched in the material object using a material number of the material. A selection condition is determined based on which the material is chosen from the material position. A restriction condition is generated in the restriction object based on the material restriction and the selection condition.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for integrating a restriction object with a material object. A reference is generated between a material object and a restriction object. A restriction note is received from a supplier having a material restriction for a material in the material object. A material position is searched in the material object using a material number of the material. A selection condition is determined based on which the material is chosen from the material position. A restriction condition is generated in the restriction object based on the material restriction and the selection condition.

Figure 1:
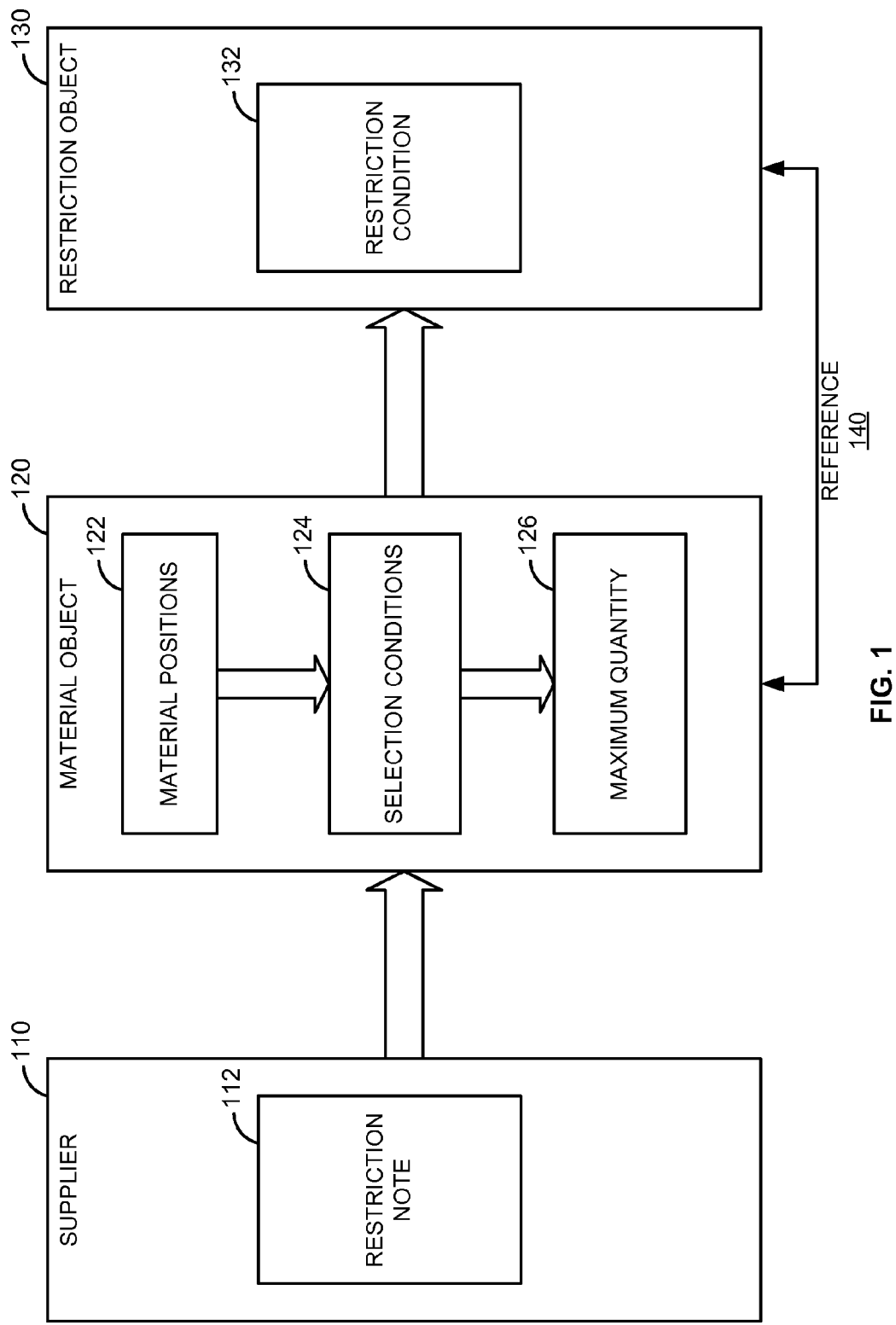
FIG. 1 is a functional block diagram of a system for integrating a restriction object with a material object according to an embodiment of the invention.

FIG. 1 is a functional block diagram of a system for integrating a restriction object with a material object according to an embodiment of the invention. Material object 120 typically is a complete, structured list of one or more materials that make up a product. The structured list typically includes a description, a quantity, and a unit of measure of the materials. Material object 120 typically includes a hierarchy of nodes with each node having one or more material positions 122. Each of the material positions 122 generally has one material that may be used to produce the product. Each material position 122 typically has a selection condition 124 assigned to the material position 122. A material is typically selected from a corresponding material position 122 based on selection condition 124 of the material position 122. Selection condition 124 is typically a Boolean expression. The material from material position 122 is generally selected for a production of the product only if the selection condition for the material position is true.

Restriction object 130 typically holds one or more restriction conditions. A restriction condition typically includes a material restriction for the material. The material restriction for the material generally includes a maximum quantity of the material to be supplied by supplier 110 in a time period. The time period may include a day, a week, a month a year or the like.

Material object 120 and restriction object 130 are typically integrated by generating reference 140 between material object 120 and restriction object 130. In an embodiment, reference 140 is generated between a restriction name attribute for a material in material object 120 and a restriction key of restriction condition 132 in restriction object 130. In an embodiment, reference 140 is generated between a selection condition attribute of selection condition 124 for a material in material object 120 and a selection condition attribute of selection condition 124 in restriction object 130. The integration of material object 120 and restriction 130 allows transparency between the two objects.

Supplier 110 typically sends restriction note 112 for a material in material object 120. Restriction note 112 typically includes a material restriction for the material. For example, the material restriction may include a maximum quantity restriction of 500 pieces per day for the material. One or more material positions 122 having the material are typically searched in material object 120 based on the material restriction. In an embodiment, material object 120 stores a unique material identifier for each material in material object 120. Material object 120 is typically searched for material positions 122 of the material using the material identifier of the material.

Selection conditions 124 for each of material positions 122 obtained as a result of searching are determined. Selection conditions 124 typically define a condition based on which the material is chosen from a corresponding material position 122 for the production of the product. Restriction condition 132 is typically generated in restriction object 130 for each selection condition 124 based on the material restriction and selection condition 124 determined from material object 120. In an embodiment restriction condition 132 is generated by generating an association between the material restriction and each selection condition 124.

In material object 120, maximum quantity 126 of the product is typically determined based on the material restriction received from supplier 110. Material object 120 generally stores a number of pieces of the material for each of material positions 122. The number of pieces is typically the number of pieces of the material used in the product. In an embodiment, the maximum quantity 126 of the product for a material position 122 is determined from the number of pieces of the material in material position 122. For example, if the number of pieces for a material in a material position is two and the material restriction is 100 pieces a day, then the maximum quantity 126 of the product is determined as 50 products a day.

Figure 2:
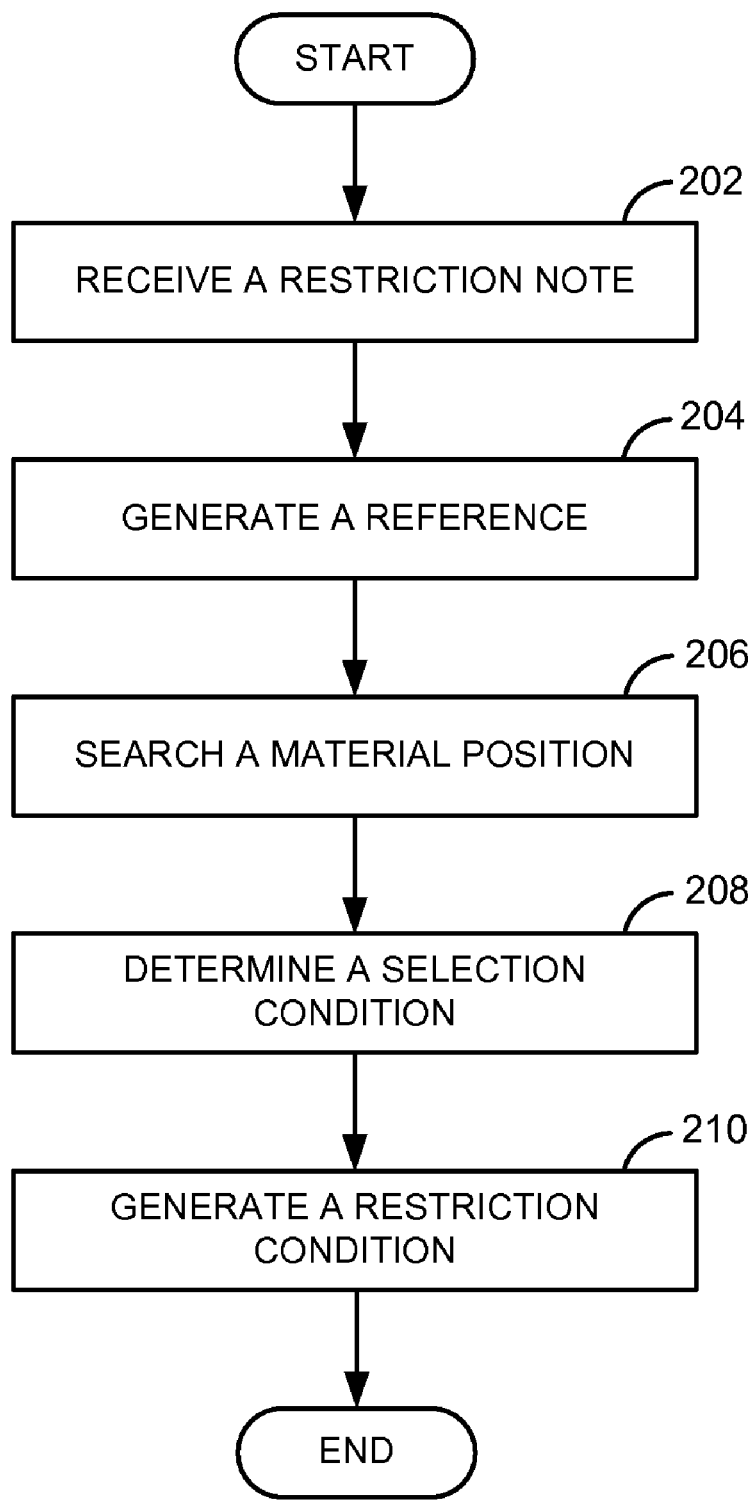
FIG. 2 is a flow diagram of a process for integrating a restriction object with a material object according to an embodiment of the invention.

FIG. 2 is a flow diagram of a process for integrating a restriction object with a material object according to an embodiment of the invention. In process block 202, a reference is typically generated between a material object and a restriction object. In an embodiment, the reference is generated between a restriction name attribute for a material in the material object and a restriction key of a restriction condition in the restriction object. In an embodiment, the reference is generated between a selection condition attribute of a selection condition for the material in the material object and a selection condition attribute of the selection condition in the restriction object.

In process block 206, a restriction note is received from a supplier with the restriction note having a material restriction for the material. The restriction note typically includes a material restriction for the material. The material restriction for the material generally includes a maximum quantity of the material to be supplied by the supplier in a time period. In process block 208, a material position is searched in the material object using a material identifier of the material. In process block 210, a selection condition is determined based on which the material is chosen from the material position typically for production of a product. In process block 212, a restriction condition is generated in the restriction object based on the material restriction and the selection condition.

Figure 3:
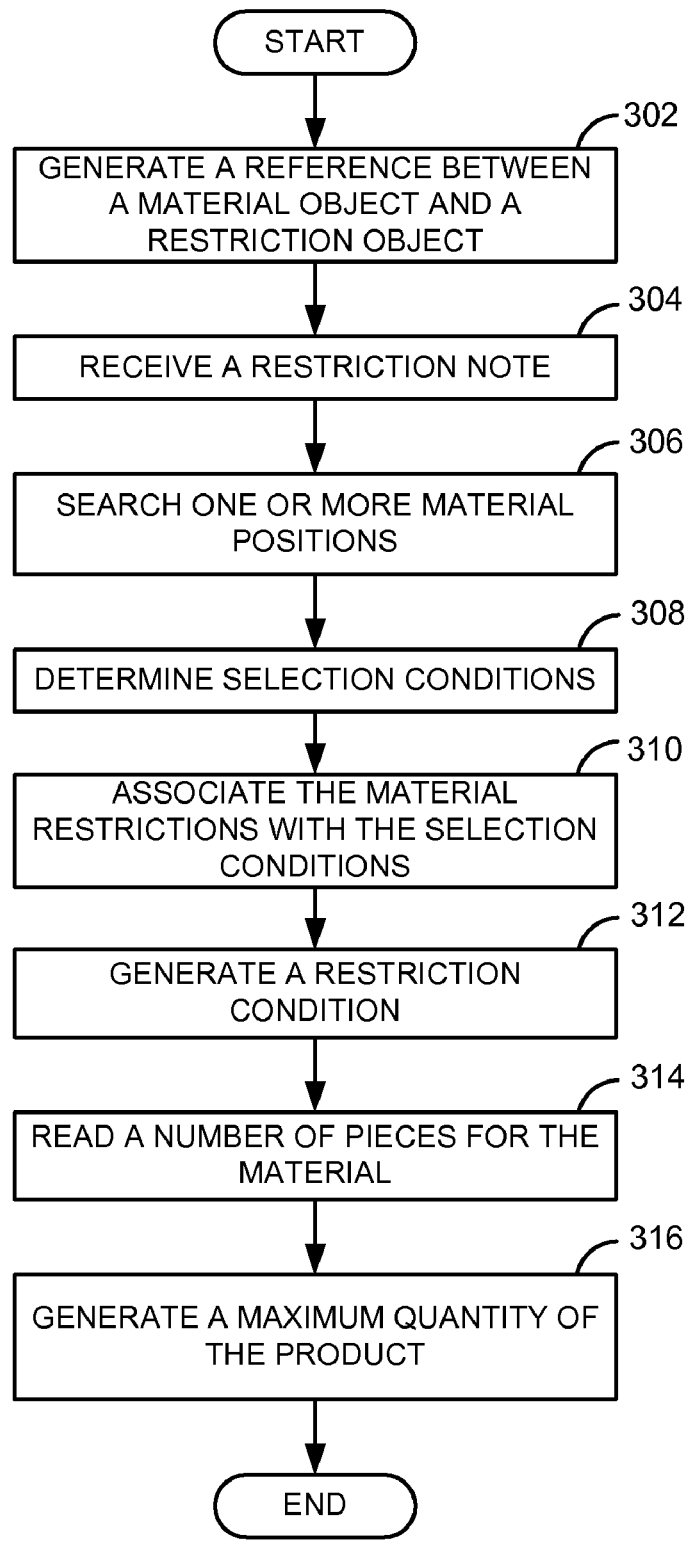
FIG. 3 is a flow diagram of a process for integrating a restriction object with a material object according to an embodiment of the invention.

FIG. 3 is a flow diagram of a process for integrating a restriction object with a material object according to an embodiment of the invention. In process block 302, a reference is generated between a material object and a restriction object. The material object is typically a complete, structured list of one or more materials that make up a product. The structured list typically includes a description, a quantity, and a unit of measure of the materials. The material object generally includes a hierarchy of nodes with each node having one or more material positions. Each of the material positions generally has one material that may be used to produce the product. Each material position typically has a selection condition assigned to the material position. A material is typically selected from a corresponding material position based on the selection condition of the material position. The selection condition is typically a Boolean expression. The material from the material position is generally selected for a production of the product only if the selection condition for the material position is true. The restriction object typically holds one or more restriction conditions. A restriction condition typically includes a material restriction for the material. The material restriction for the material generally includes a maximum quantity of the material to be supplied by a supplier in a time period. In an embodiment, the reference is generated between a restriction name attribute for a material in the material object and a restriction key of a restriction condition in the restriction object. In an embodiment, the reference is generated between a selection condition attribute of a selection condition for the material in the material object and a selection condition attribute of the selection condition in the restriction object.

In process block 304, a restriction note is received from the supplier. The restriction note typically includes a material restriction for the material. In process block 306, one or more material positions are searched in the material object based on the material restriction. In an embodiment the material object is searched for the material positions of the material using a material identifier of the material. In process block 308, the selection conditions for each of the material positions obtained as a result of searching are determined. The selection condition typically defines a condition based on which the material is chosen from a corresponding material position for the production of the product. In process block 310, the material restriction is associated with each selection condition determined from the material object. In process block 312, a restriction condition is generated in the restriction object for each of the selection conditions.

In process block 314, a number of pieces is read from the material positions. The material object generally stores a number of pieces of the material for each of the material positions. The number of pieces is typically the number of pieces of the material used in the product. In process block 316, a maximum quantity of the product is typically determined. In an embodiment, the maximum quantity of the product for a material position is determined from the number of pieces of the material in a material position.

Figure 4:
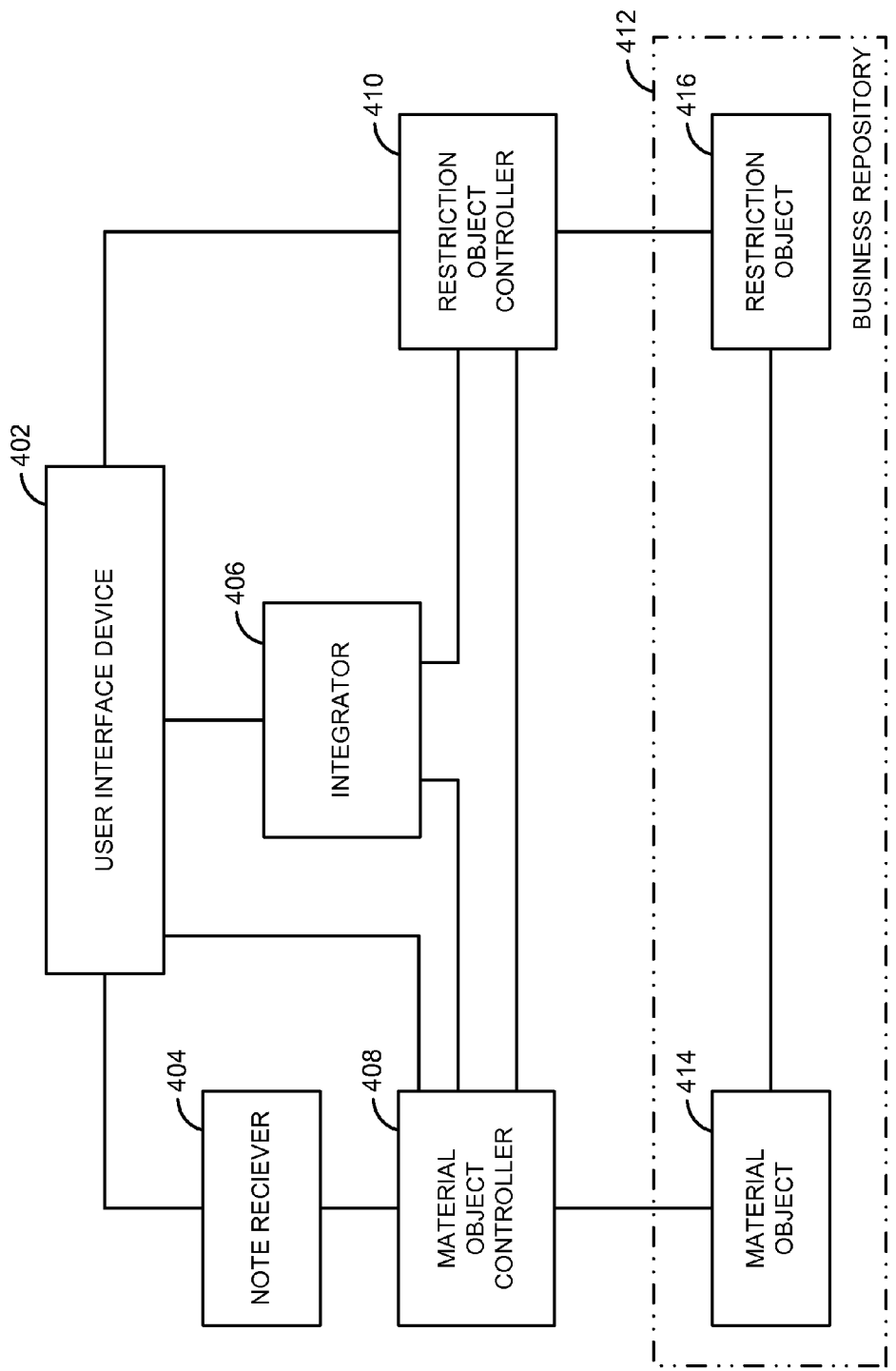
FIG. 4 is a block diagram of a system for integrating a restriction object with a material object useful for implementing the invention according to an embodiment of the invention.

FIG. 4 is a block diagram of a system for integrating a restriction object with a material object useful for implementing the invention according to an embodiment of the invention. Material object 414 typically is a complete, structured list of one or more materials that make up a product. The structured list typically includes a description, a quantity, and a unit of measure of the materials. Material object 414 typically includes a hierarchy of nodes with each node having one or more material positions. Each of the material positions generally has one material that may be used to produce the product. Each material position typically has a selection condition assigned to the material position. A material is typically selected from a corresponding material position based on the selection condition of the material position. The selection condition is typically a Boolean expression. The material from the material position is generally selected for a production of the product only if the selection condition for the material position is true.

Restriction object 416 typically holds one or more restriction conditions. A restriction condition typically includes a material restriction for the material. The material restriction for the material generally includes a maximum quantity of the material to be supplied by a supplier in a time period. The time period may include a day, a week, a month a year or the like. In an embodiment, material object 414 and restriction object 416 are stored in business repository 412.

Material object 414 and restriction object 416 are typically integrated by integrator 406 by generating a reference between material object 414 and restriction object 416. In an embodiment, integrator 406 generates the reference between a restriction name attribute for a material in material object 414 and a restriction key of a restriction condition in restriction object 416. In an embodiment, integrator 406 generates the reference between a selection condition attribute of a selection condition for a material in material object 414 and a selection condition attribute of the selection condition in restriction object 416.

User interface device 402 may be used by the supplier to send a restriction note for a material in material object 414. It is the responsibility of note receiver 404 to receive the restriction note sent by the supplier. The restriction note typically includes a material restriction for the material.

One or more material positions having the material are typically searched in material object 414 based on the material restriction by material object controller 408. In an embodiment, material object 414 stores a unique material identifier for each material in material object 414. Material object 414 is typically searched by material object controller 408 for the material positions of the material using the material identifier of the material. The selection conditions for each of the material positions obtained as a result of searching are determined by material controller 408. The selection conditions typically define a condition based on which the material is chosen from a corresponding material position for the production of the product.

Restriction object controller 410 typically generates a restriction condition in restriction object 416 for each of the selection conditions based on the material restriction and the selection condition determined from material object 414. In an embodiment the restriction condition is generated by restriction object controller 410 by generating an association between the material restriction and each of the selection conditions.

In material object 414, a maximum quantity of the product is typically determined by material object controller 408 based on the material restriction received from the supplier. In an embodiment, the maximum quantity of the product for a material position is determined from a number of pieces of the material in a material position.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine executable instructions. The machine-readable medium is an article of manufacture and may include, but is not limited to, flash memory, optical disks, CD-ROMs, DVD ROMs, RAMs, EPROMs, EEPROMs, magnetic or optical cards, other type of machine-readable media suitable for storing electronic instructions. For example, the invention may be downloaded as a computer program which may be transferred from a remote computer (e.g., a server) to a requesting computer (e.g., a client) by way of a communication link (e.g., a modem or network connection).

What is claimed is:

1. A computer-implemented method executing on a microprocessor, comprising:
   generating, using the microprocessor, a reference between a restriction name attribute in a material object and a restriction key in a restriction object, and between a first selection condition attribute in the material object and a second selection condition attribute in the restriction object, the material object and the restriction object residing in computer memory;
   receiving a restriction note through a graphical user interface (GUI) from a supplier having a material restriction for a material in the material object;
   searching, the microprocessor, a material position in the material object within the computer memory using a material identifier of the material;
   determining, using the microprocessor, a selection condition based on which the material is chosen from the material position, wherein the material from the material position is selected for a production of a product when the selection condition for the material position is true; and generating, using the microprocessor, a restriction condition in the restriction object within the computer memory based on the material restriction and the selection condition.

2. The method of claim 1 wherein generating the restriction condition comprises generating an association between the material restriction and the selection condition.

3. The method of claim 1 further comprising converting a shipment quantity of a product to a maximum shipment quantity of the product based on the restriction condition.

4. The method of claim 3 wherein converting the shipment quantity to a maximum shipment quantity comprises:
   reading a number of pieces of the material used in the product; and
   calculating the maximum shipment quantity of the product based on the number of pieces of the material.

5. The method of claim 1 wherein the material restriction comprises a maximum quantity of the material to be supplied in a time period.

6. The method of claim 5 wherein the time period is selected from a group comprising a day, a week, a month and a year.

7. The method of claim 1 wherein the material object has the material arranged in a hierarchy of material positions.

8. The method of claim 1 wherein the selection condition is a boolean expression.

9. A computer system including at least one processor and memory storing program code, the code comprising:
   a material object for storing a material within the memory;
   a restriction object for storing a restriction condition for the material within the memory;
   an integrator within the memory for generating a reference between a restriction name attribute in the material object and a restriction key in the restriction object, and between a first selection condition attribute in the material object and a second selection condition attribute in the restriction object;
   a note receiver within the memory for receiving a restriction note from a supplier having a material restriction for a material in the material object;
   a material object controller within the memory coupled to the integrator, the note receiver and the material object for searching a material position in the material object using a material identifier of the material, the material object controller determining a selection condition based on which the material is chosen from the material position, wherein the material from the material position is selected for a production of a product when the selection condition for the material position is true; and
   a restriction object controller within the memory coupled to the integrator, the material object controller and the restriction object for generating a restriction condition in the restriction object based on the material restriction and the selection condition.

10. A non-transitory machine-accessible medium that provides instructions that, when executed by a machine, cause the machine to perform operations comprising:
   generating a reference between a restriction name attribute in a material object and a restriction key in a restriction object, and between a first selection condition attribute in the material object and a second selection condition attribute in the restriction object;
   receiving a restriction note from a supplier having a material restriction for a material in the material object;
   searching a material position in the material object using a material identifier of the material;
   determining a selection condition based on which the material is chosen from the material position, wherein the material from the material position is selected for a production of a product when the selection condition for the material position is true; and
   generating a restriction condition in the restriction object based on the material restriction and the selection condition.

11. The machine-accessible medium of claim 10 wherein generating the restriction condition comprises generating an association between the material restriction and the selection condition.

12. The machine-accessible medium of claim 10 further providing instructions which when executed by the machine cause the machine to perform further operations comprising converting a shipment quantity of a product to a maximum shipment quantity of the product based on the restriction condition.

13. The machine-accessible medium of claim 12 wherein converting the shipment quantity to a maximum shipment quantity comprises:
   reading a number of pieces of the material used in the product; and
   calculating the maximum shipment quantity of the product based on the number of pieces of the material.

14. The machine-accessible medium of claim 10 wherein the material restriction comprises a maximum quantity of the material to be supplied in a time period.

15. The machine-accessible medium of claim 10 wherein the material object has the material arranged in a hierarchy of material positions.

16. The machine-accessible medium of claim 10 wherein the selection condition is a boolean expression.

* * * * *